United States Patent [19]
Brenner

[11] 3,800,467
[45] Apr. 2, 1974

[54] SIMULATED FLIGHT INDICATOR PANEL
[76] Inventor: Robert R. Brenner, 11930 N. Bay Shore Dr., Apt. 606, North Miami, Fla. 33161
[22] Filed: Oct. 18, 1972
[21] Appl. No.: 298,670

[52] U.S. Cl. .................................................. 46/1 B
[51] Int. Cl. ............................................. A63h 33/00
[58] Field of Search ........ 46/1 B; 272/1 D; 773/132; 206/DIG. 18

[56] References Cited
UNITED STATES PATENTS
| 2,332,216 | 10/1943 | Gold | 46/1 B |
| 2,122,999 | 7/1938 | Burke | 206/DIG. 18 |
| 483,324 | 9/1892 | Knight | 273/132 |

Primary Examiner—Antonio F. Guida
Assistant Examiner—J. Q. Lever

[57] ABSTRACT

A simulated flight indicator panel is designed to amuse and to occupy the attention of a child during a flight in an aircraft. The panel includes dial means, printed on a base member, to record the destination, arrival time, the altitude called for in the flight plan of the aircraft, the speed of the aircraft, a bank indicator and alternatively a compass. The base member is comprised of a light-weight cardboard sheet, and the indicator needles and attachment means are provided as punch-outs in a throw-away portion of the base member. Means are included to adhesively fasten the base member in a suspended manner to the back of the seat in front of the child using the device.

8 Claims, 8 Drawing Figures 3,800,467

SIMULATED FLIGHT INDICATOR PANEL

STATE OF THE PRIOR ART

U.S. Pat. No. 2,864,613 to E. C. Porter discloses an airplane toy amusement device for a child, comprised generally of a hollow airplane-like structure which may be carried by a child on his shoulders with his hands, and with his head extending into the hollow structure so that he can see through at least an open front thereof and run about and play and simultate the operation of an airplane.

U.S. Pat. No. 2,243,973 to E. K. Mills, Jr. discloses an airplane pilot trainer comprised generally of a practice device, simulating an airplane cockpit with control members and indicators so interconnected that when the control members are operated, the indicators respond in a manner similar to the response of airplane instruments to the corresponding maneuvers of the airplane.

U.S. Pat. No. 2,324,833 to Sam Gold comprises generally a cardboard structure for simulating certain important parts of an actual airplane cockpit, and the relationships of such parts to one another, the structures being primarily intended for conjoint use and being of such relative sizes that a student will be enabled to experience some of the basic problems confronting an actual flier.

U.S. Pat. No. 2,454,693 to C. H. Foster discloses an airplane control toy which is comprised generally of a plurality of indicator dials and control means, the operation of which causes the indicator dials to record, in simulation, the movements of an airplane in response to said operation.

BACKGROUND OF THE PRESENT INVENTION

The present invention is directed to a simulated flight indicator panel which is intended to occupy the attention of a child, for instance, during the flight time on a commercial airliner. No actual control means or the like are connected to the indicator panel.

Children often become bored when confined to an immobile condition for a prolonged period of time. In spite of the initial thrill that a child may experience when confronted with the prospects of a flight in an airplane, he or she generally becomes restless after a relatively short period of time when confined to a chair. The primary concept of the present invention is to provide a very inexpensive giveaway for commercial airlines to occupy the attention of children during the flight time.

Basically, the simulated flight indicator panel of the present invention is comprised of a panel having a time indicator dial, including hour and minute hands, which can be set by a child to indicate the announced time of arrival of the aircraft at its destination, a destination dial including a hand to indicate the destination city of the aircraft, and speed and altitude indicator dials, including hands, to indicate the announced speed and altitude of the aircraft. A pendulum type of hand is loosely, pivotally attached to the panel to indicate the degree of bank, left or right, of the aircraft. Additionally, a small, inexpensive compass may be attached to the panel.

It is contemplated that the panel will include a tear-off portion including punch-out indicator hands and attachment means therefor. After the hands and attachment means are punched therefrom, the tear-off portion is discarded. With simple directions from his or her parents or a stewardess, the child will occupy a portion of the flying time in assembling the device. Many pilots presently announce to the passengers some aspects of their flight plans, such as their air speeds, altitudes and projected times of arrival at their destinations. Airlines utilizing the device of the present invention would make it a practice to have their pilots make these announcements as a regular policy.

Many people, particularly children, who are unaccustomed to flying are not really aware of some of the movements of an aircraft such as those experienced in banking. The bank indicator dial and hand are therefore very helpful in teaching children some of the basic principles involved in the flight movements of an aircraft.

With the addition of a very inexpensive compass, the simulated flight indicator panel of the present invention will enable a child to follow the direction of flight of the aircraft from take-off to landing to provide additional interest in the basic operation of an airplane.

DETAILED DESCRIPTION OF THE DRAWINGS

Figures 1, 2:
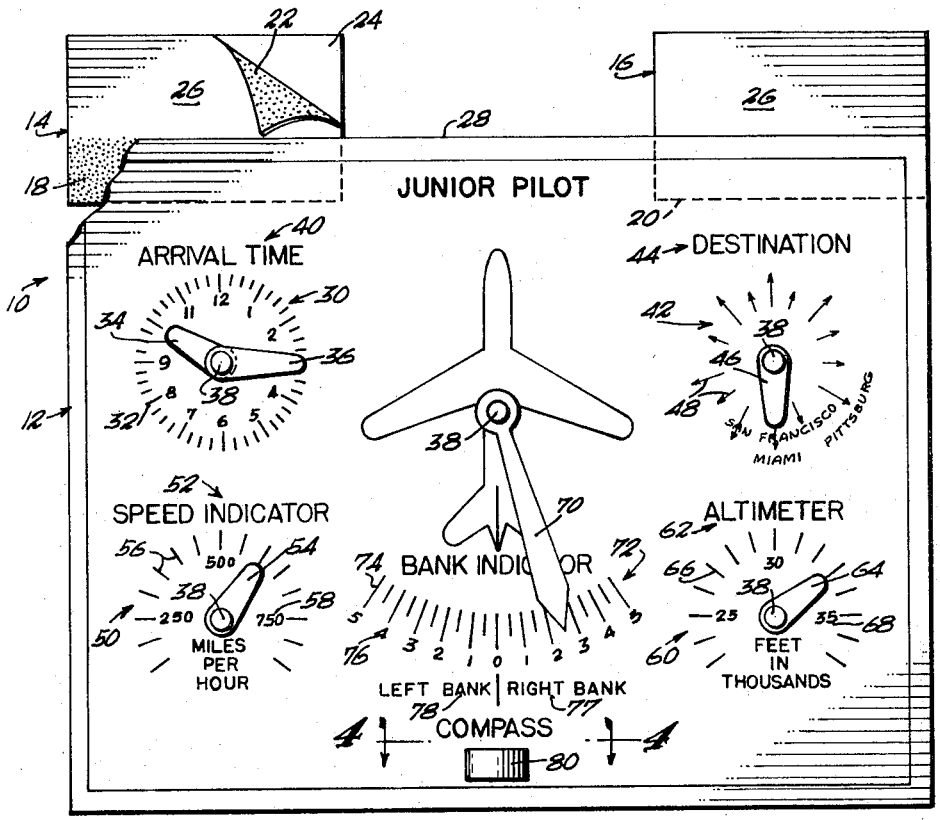
FIG. 1 is a plan view of the simulated flight indicator panel of the present invention in a fully assembled condition.
FIG. 2 is a plan view of the simulated flight indicator panel of the present invention with the detachable throw-away portion, including the punch-out indicator hands and attachment means, in a fixed relation thereto.

With reference to the drawings in which like reference numerals designate like or corresponding parts throughout the various views and with particular reference to FIG. 1, the numeral 10 generally indicates the simulated flight indicator panel of the present invention in an assembled condition.

The flight indicator panel 10 is comprised generally of a base member 12, preferably formed of a lightweight cardboard or heavy paper with means to attach same to a surface such as the back of an aircraft seat. The attachment means may be comprised of a pair of tabs 14 and 16 adhesively secured at 18 and 20 to the opposed, upper rear edges of base member 12. In the form illustrated, a pressure sensitive adhesive 22 is applied to the back side of the tabs 14 and 16 and a peel-off strip 24 is normally engaged with the adhesive 22. Alternatively, the pressure sensitive adhesive 22 may be applied to the front surface 26 of each tab 14 and 16, and when the peel-off strips are removed, the tabs are folded over rearwardly along the top edge 28 of the base member 12 for attachment to the back of the aircraft seat.

With further reference to FIG. 1, a plurality of dials are printed on the front face of the base member 12. A first dial 30, simulating a clock, includes hour and fractional hour markings 32 along with hour and minute hands 34 and 36 which are manually rotatable about a pivot means 38 which will be hereinafter described. The first dial is appropriately designated "Arrival Time" at 40.

A second dial 42, identified at 44 as "Destination," includes a single indicator hand 46 which is rotatable about a pivot means 38 into selective alignment with any one of a plurality of radially extending arrows 48. Each arrow points to the name of a city printed about the outer periphery of the dial 42.

A third dial 50, identified at 52 as "Speed Indicator," includes a single indicator hand 54, rotatable about a pivot means 38 into selective alignment with any one of a plurality of markings 56 or numbers 58 within the speed range of the aircraft.

A fourth dial 60, identified at 62 as "Altimeter," includes a single indicator hand 64, rotatable about a pivot means 38 into selective alignment with any one of a plurality of markings 66 or numerals 68, indicating feet in thousands, to record the announced flying altitude of the airplane.

Preferably, centrally of the base member 12, an elongated, pendulum type of indicator hand 70 is loosely suspended from a pivot means 38 to normally hang downwardly in a vertical attitude when the aircraft is flying on an even keel. When the aircraft banks right or left, the base member 12 is simularly angulated while the pendulum hand 70 remains in its vertical attitude. An arcuate dial segment 72 is printed on the base member 12 in a position to record the direction and the degree of movement of the base member 12, relative to the hand 70, when the airplane banks. The arcuate dial segment 72 is comprised of a plurality of radially extending marks 74 and numbers 76 and the right and left bank portions of the dial segment 72 are identified at 77 and 78.

Figure 4:
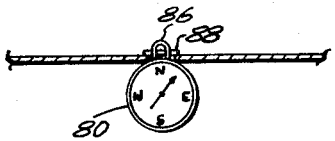
FIG. 4 is a cross sectional view taken along the line 4 — 4 of FIG. 1.

A small, inexpensive compass 80 may be attached in any convenient manner to the base member 12, preferably centrally of the bottom portion thereof. FIG. 4 illustrates one manner of attachment in which a small hole 82 (FIGS. 2 and 4) is provided in the base member 12. A loop 86 is formed on the peripheral wall of the compass 80 and a wedge shaped member 88 is forced into the loop 86 to hold the compass 80 in place, as shown in FIG. 4.

Figure 7:
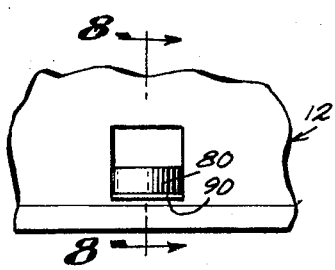
FIG. 7 is a fragmentary elevational view illustrating a modified form of compass attachment.
Figure 8:
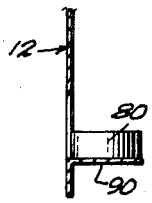
FIG. 8 is a vertical sectional view taken along the line 8 — 8 of FIG. 7.

Another manner of compass attachment is illustrated in FIGS. 7 and 8. A fold out tab 90 is appropriately scored around three sides and is provided with a pressure sensitive adhesive on the back side (not shown) with a peel-off strip. As illustrated in FIGS. 7 and 8, the tab 90 is folded out, the peel-off strip removed and the compass 80 is firmly seated on the adhesive. The tab 90 may be scored to fold downwardly as illustrated or upwardly from the bottom edge of the base member 12.

With reference to FIG. 2, the base member 12 is initially formed with a panel portion 94 which is removable therefrom along a score line 96. As illustrated, all of the indicator hands 34, 36, 46, 54, 64 and 70, as well as the compass wedge 88, are formed as punch-outs by appropriately scoring the removable portion 94.

Figure 3:
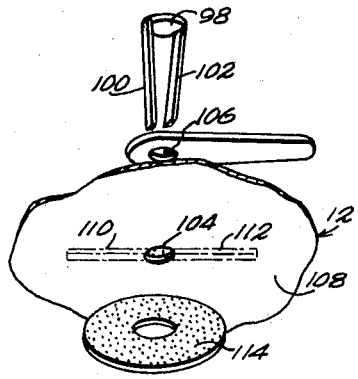
FIG. 3 is an exploded perspective view illustrating the means for attaching the indicator hands to the panel.

Five identical punch-out pivot means 38 are also formed by appropriately scoring the removable panel portion 94. Each pivot means 38 is comprised of a center hub portion 98 and a pair of relatively narrow oppositely extending arms 100 and 102. After the indicator hands and pivot means are punched out, the hands are all mounted relative to their respective dials 32, 42, 50, 60 and 72 in the manner illustrated in FIG. 3. Each dial and indicator hand is provided with a hole 104 and 106 (FIGS. 2 and 3) to receive therethrough the arms 100 and 102 of a pivot means 38 when they are folded as illustrated in FIG. 3. After passage through the holes 104 and 106, the arms 100 and 102 are folded flat against the back side 108 of the base member 12 as illustrated at 110 and 112, and a conventional reinforcing ring 114 is used to adhesively fasten them in place against the back side 108. A similar reinforcing ring may be applied over the wedge 88 to secure the compass 80 to the base member 12. The respective hands 34, 36, 46, 54 and 64 are rotatably confined against the dial portions of the front face of the base member 12 by the hubs 98. As best illustrated in FIG. 2, the hole 116 in the pendulum hand 70 is somewhat enlarged to permit said hand 70 to swing freely on its pivot means 38.

Figure 5:
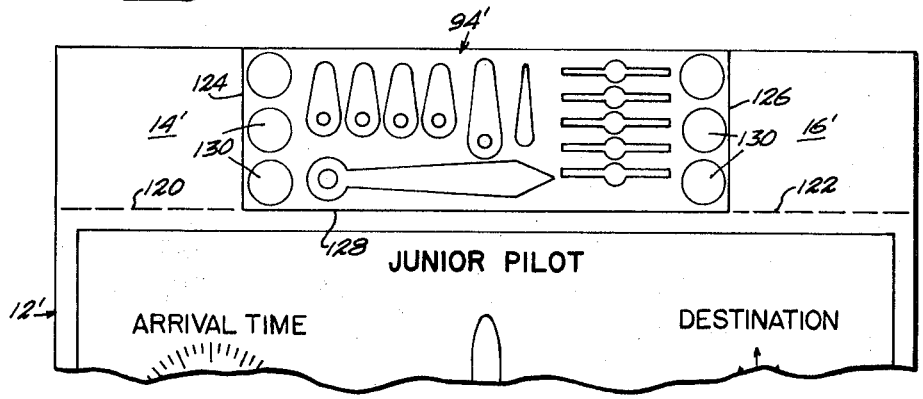
FIG. 5 is a fragmentary plan view of a modified form of the present invention.
Figure 6:
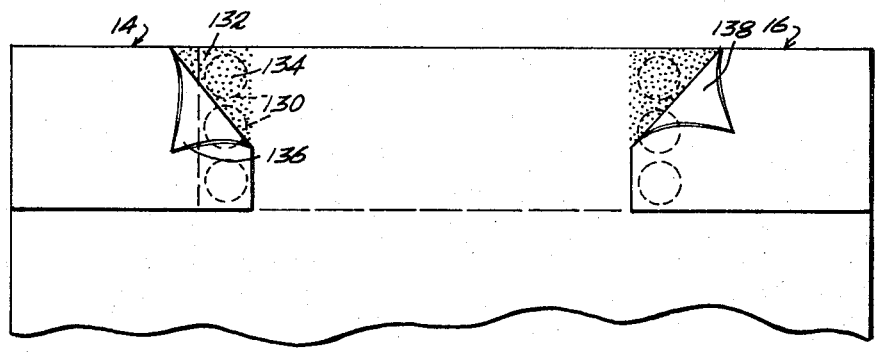
FIG. 6 is a fragmentary back side view of the modified form of FIG. 5.

FIG. 5 and 6 illustrate a somewhat modified form of the present invention in which the tabs 14' and 16' are formed integral with the base member 12' and are defined by perforated lines 120 and 122. The removable panel portion 94' is formed between the tabs 14' and 16' and is defined by the score lines 124, 126 and 128. All of the punch-out indicator hands and pivot means are formed in the panel 94' in the same manner as described relative to the panel 94 and need no further explanation. Six punch-out discs 130 are formed in the panel 94'.

FIG. 6 illustrates the back side of FIG. 5, and a pressure sensitive adhesive 132 is applied to the back sides of the tabs 14' and 16' and extends across the six discs 130 as at 134. The discs 130 are used in place of the reinforcing rings 114 of FIG. 3. Peel-off strips 136 and 138 extend across the tabs 14', 16' and the discs 130.

In use, the punch-out parts are assembled to the simulated flight indicator panel in the manner above described, and the peel-off strips 24 are removed from the tabs 14 and 16 whereupon the panel is secured to the back of the seat in front of the child using the device. The base member will assume a substantially vertical attitude permitting the bank indicator hand 70 to function properly. The area 140 of the removable panel 94 may include printed assembly instructions. Other printed matter, such as the name "Junior Pilot" and the jet plane 142 may be applied to the face of the base member 12 along with the name of an airline or the like.

What is claimed is:

1. A simulated flight indicator panel comprising:
   A. A base member formed of a relative thin sheet material adapted to be attached to the back of a seat in an airplane;
   B. A plurality of indicator dials on said base member including; a bank indicator dial including an elongated pendulum indicator hand, loosely suspended from a pivot means to depend vertically therefrom at all times when said base member is suspended in a vertical attitude, and indicia printed on said base member to indicate the degree of banking of an airplane;

C. Hinged tab means extended at least partially across the top of said base member, including a pressure sensitive adhesive on said hinge tab to suspend said base member in a substantially vertical attitude regardless of the position of said seat and said plane.

2. A simulated flight indicator panel as defined in claim 1 in which said plurality of indicator dials also includes;
   1. a clock dial comprised of hour marking printed on said base member and hour and minute hands rotatably fixed to said base member by a first pivot means,
   2. a destination dial including a first indicator hand, rotatable about a second pivot means into selective alignment with any one of a plurality of printed names of cities,
   3. a speed indicator dial including a second indicator hand, rotatable about a third pivot means into selective alignment with any one of a plurality of printed speed markings,
   4. an altimeter dial including a third indicator hand, rotatable about a fourth pivot means into selective alignment with any one of a plurality of printed altitude markings.

3. A simulated flight indicator panel, as defined in claim 2, wherein each of said pivot means is comprised of a central hub portion and a pair of relatively narrow, oppositely extending arms which are folded together for insertion through a hole in one or more of said hands and a similar hole in one of said dials whereupon said arms are folded flat against the back side of said base member and secured thereto by a relatively small adhesive backed member.

4. A simulated flight indicator panel, as defined in claim 1, including a compass fixed to said base member and extending horizontally outwardly therefrom.

5. A simulated flight indicator panel, as defined in claim 1, wherein said tab means comprises a pair of tabs adhesively fixed to the respective end portions of the top of said base member.

6. A simulated flight indicator panel, as defined in claim 1, wherein said tab means comprises a pair of tabs formed integral with said base member and being bendable along a perforated score line co-linear with the top edge thereof, said pair of tabs extending upwardly therefrom in a spaced apart relation adjacent the respective top end portions of said base member.

7. A simulated flight indicator panel, as defined in claim 6, including a top panel formed integral with said base member and said pair of tabs and being removable therefrom along three score lines.

8. A simulated flight indicator panel, as defined in claim 7, including a plurality of punch-out discs in said top panel having a pressure sensitive adhesive on one side thereof.

\* \* \* \* \*